US009773220B2

(12) United States Patent
Blanchard et al.

(10) Patent No.: US 9,773,220 B2
(45) Date of Patent: Sep. 26, 2017

(54) MASTER CASE TRACKING MESH FOR DATA TRANSMISSION IN HIGHLY SHIELDED ENVIRONMENT

(71) Applicant: SICPA HOLDING SA, Prilly (CH)

(72) Inventors: Hubert Blanchard, St-Saphorin (CH); Giorgio Caset, Le Mont-sur-Lausanne (CH); Xavier Marguerettaz, Martigny (CH); Xavier Cedric Raemy, Belmont-sur-Lausanne (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/917,755

(22) PCT Filed: Sep. 10, 2014

(86) PCT No.: PCT/EP2014/069326
§ 371 (c)(1),
(2) Date: Mar. 9, 2016

(87) PCT Pub. No.: WO2014/036452
PCT Pub. Date: Mar. 19, 2015

(65) Prior Publication Data
US 2016/0224929 A1 Aug. 4, 2016

Related U.S. Application Data

(60) Provisional application No. 61/875,924, filed on Sep. 10, 2013, provisional application No. 61/882,982, filed on Sep. 26, 2013.

(30) Foreign Application Priority Data

Sep. 10, 2013 (WO) ................. PCT/EP2013/068759

(51) Int. Cl.
*G07B 15/02* (2011.01)
*G06Q 10/08* (2012.01)
(Continued)

(52) U.S. Cl.
CPC ....... *G06Q 10/08* (2013.01); *G06F 17/30879* (2013.01); *G06K 19/07758* (2013.01); *G06Q 10/0833* (2013.01)

(58) Field of Classification Search
CPC ........ G07B 15/02; G07B 15/00; G06K 17/00; G06K 7/10693; G06K 7/10881
(Continued)

(56) References Cited

U.S. PATENT DOCUMENTS 6,972,682 B2 * 12/2005 Lareau .................. G06Q 10/08
340/5.92
2003/0137968 A1 7/2003 Lareau et al.
(Continued)

FOREIGN PATENT DOCUMENTS

DE 10 2005 03824 7/2006
EP 1 895 456 3/2008
(Continued)

*Primary Examiner* — Karl D Frech
(74) *Attorney, Agent, or Firm* — Greenblum & Bernstein, P.L.C.

(57) ABSTRACT

Master case tracking mesh for data transmission includes a shipping container for holding items to be transported therein. The shipping container may include a central data storage unit configured to receive data transmitted thereto, and a plurality of electronic tags configured to store data of the items, and further configured to transmit data of the items to the central data storage unit.

13 Claims, 6 Drawing Sheets

(51) Int. Cl.
*G06F 17/30* (2006.01)
*G06K 19/077* (2006.01)

(58) Field of Classification Search
USPC ............................. 235/462.43, 384, 462.13
See application file for complete search history.

(56) References Cited

U.S. PATENT DOCUMENTS

| | | |
|---|---|---|
| 2004/0201454 A1 | 10/2004 | Waterhouse et al. |
| 2007/0024449 A1 | 2/2007 | Bilyeu et al. |
| 2007/0164863 A1 | 7/2007 | Himberger et al. |
| 2007/0282716 A1 | 12/2007 | Branigan et al. |
| 2008/0056191 A1 | 3/2008 | Heinonen et al. |
| 2008/0311550 A1* | 12/2008 | Giambrone ............ G09B 19/00 434/353 |
| 2009/0213785 A1 | 8/2009 | Hupp et al. |
| 2011/0274275 A1 | 11/2011 | Seitz |
| 2013/0063251 A1 | 3/2013 | Allen |
| 2014/0009290 A1 | 1/2014 | Vogt |

FOREIGN PATENT DOCUMENTS

| | | |
|---|---|---|
| WO | 2011/025843 | 3/2011 |
| WO | 2012/125947 | 9/2012 |

\* cited by examiner

Departure Port

| 1A(i) | 2B(ii) | 3C(iii) |
|---|---|---|
| 4D(iv) | 5E(v) | 6F(vi) |
| 7G(vii) | 8H (viii) | 9I(ix) |

↓

Arrival Port

| 1A(i) | 2B(ii) | 3C(iii) |
|---|---|---|
| 4D(iv) | <u>8H</u>(v) | 6F(vi) |
| 7G(vii) | <u>9I</u> (viii) | <u>5E</u>(ix) |

Fig. 7

MASTER CASE TRACKING MESH FOR DATA TRANSMISSION IN HIGHLY SHIELDED ENVIRONMENT

BACKGROUND

1. Field of the Disclosure

The present disclosure relates to the field of tracking items to be transported, and more particularly relates to a secure and efficient way to track items using electronic tags and a mesh network and to verify cargo without opening the shipping container.

2. Background Information

In today's global economy, it has become desirable to transport goods as efficiently and as securely as possible. In order to track and trace goods throughout the shipping process, it has been proposed to use electronic tags, such as RFID tags. However, in the case of cigarettes, which are surrounded by aluminum foil in a pack (the packs typically packed in cartons, which are in turn placed in master cases), the transmission distance of such tags is limited by frequency attenuation of the aluminum foil. It has thus become desirable for an efficient and cost-effective tracking and tracing system for transporting cigarettes and other goods.

SUMMARY OF THE DISCLOSURE

A feature of the disclosure exploits the short distance between master cases by creating a master case node mesh allowing the transmission of data from one node to the other. Each master case node acts as a relay to transfer data to another master case node, creating a "chain" that allows data transmission from master case node to master case node until a central data storage unit receives the transmission. In a feature, the central data storage unit is placed close to at least one master case such that the master case node directly or indirectly transits data to the central data storage unit.

Since master cases are boxes that are arranged one on top of the other, as well as next to each other, the distance between master cases is much shorter than the distance to a central node (also referred to as a "central data storage unit" or "CDSU"). To allow centralized information storage, the traceability information stored in each tag may be transmitted to the CDSU. In addition, the master cases may be stored on pallets on which another type of node could be placed.

In order to limit the size of the mesh between master cases and to allow central storage at the palette level, another node could be put on each palette. The mesh of master cases would thus allow the communication between master cases of a single palette to the palette node. A mesh of pallet nodes, similar to the mesh of master cases could then be used to transfer data from pallet to pallet until the central node.

The CDSU could be place for example in a container, in a truck, wagon or even a warehouse at 10 meters away or more from some of the most far master cases. In such cases the distance between the master case tags and the central node is too big to allow data transfer in such environment made of thousands of cigarette packs.

A non-limiting of the disclosure provides a shipping container for holding items to be transported therein, the shipping container having a central data storage unit configured to receive data transmitted thereto, a plurality of electronic tags configured to store data of the items, and further configured to transmit data of the items to the central data storage unit.

Further, the plurality of electronic tags may include a plurality of node tags making up a mesh network, each node tag configured to receive data transmitted from a different node tag and transmit the received data to at least one of another node tag and the central data storage unit.

The data of the items may include at least one of: the type of item, proximity of items to each other, ID code and location of the items. Also, the plurality of electronic tags may include at least one of RF, RFID, WiFi, Bluetooth, Bluetooth Low Energy, Active Bat, near field communication, and Foundation Fieldbus H1. In an aspect, the items may be at least one of tobacco products, timepieces, beverages, medicine, food, machine parts and electronic components.

Further, the plurality of electronic tags may be configured to transmit data of the entirety of items held in the shipping container to the central data storage unit. Also, the central data storage unit may be mounted to an exterior surface of the shipping container. Additionally, each electronic tag of the plurality of electronic tags may include a unique identifier code. Also, an amplifier configured to amplify a signal of data transmitted to the central data storage unit may be provided.

In a further aspect, the items are configured to be stored in a plurality of master cases configured to be stored in the shipping container, the plurality of electronic tags has a plurality of master case tags, wherein each master case tag of the plurality of master case tags may be configured to store data of a respective master case, and may be further configured to transmit data of a respective master case to the central data storage unit.

The plurality of master case tags may include a plurality of master case node tags making up a mesh network, each master case node tag configured to receive data transmitted from a different master case node tag and transmit the received data to at least one of another master case node tag and the central data storage unit. Further, the master cases may be configured to be stored on a plurality of pallets, the plurality of electronic tags may have a plurality of pallet tags, wherein each pallet tag of the plurality of pallet tags may be configured to store data of a respective pallet and the plurality of master cases stored on the respective pallet, and may be further configured to transmit data of at least one of a respective pallet and a master case to the central data storage unit.

The plurality of master case tags and the plurality of pallet tags may include a plurality of node tags making up a mesh network, each node tag configured to receive data transmitted from a different node tag and transmit the received data to at least one of another node tag and the central data storage unit. Also, the mesh network may be configured to transmit data of the entirety of items held in the shipping container to the central data storage unit.

In a further feature, each master case tag of the plurality of master case tags may have a memory, each pallet tag of the plurality of pallet tags may have a memory; and the memory of a pallet tag of the plurality of pallet tags may be larger than the total combined memory of master case tags of respective master cases stored on the pallet.

Also, only master cases of the plurality of master cases closest to the central data storage unit may be configured to transmit data to the central data storage unit. Further, the plurality of master case tags may be tags of a different type from the plurality of pallet tags. Additionally, the plurality of master case tags may be tags of a same type as the plurality of pallet tags.

In an additional feature, the items may be configured to be stored on a plurality of pallets, the plurality of electronic tags may have a plurality of pallet tags, wherein each pallet tag of the plurality of pallet tags may be configured to store data of a respective pallet, and may be further configured to transmit data of a respective pallet to the central data storage unit.

The plurality of pallet tags may include a plurality of pallet node tags making up a mesh network, each pallet node tag configured to receive data transmitted from a different pallet node tag and transmit the received data to at least one of another pallet node tag and the central data storage unit. Also, in a feature, only pallets of the plurality of pallets closest to the central data storage unit may be configured to transmit data to the central data storage unit.

A further aspect provides a shipping container for holding items, the items contained in a plurality of master cases, the master cases stored on a plurality of pallets, the pallets stored in the shipping container, the shipping container having a central data storage unit configured to receive data transmitted thereto; a plurality of master case tags, wherein each master case tag of the plurality of master case tags may be configured to store data of a respective master case, and may be further configured to transmit data of a respective master case to the central data storage unit; a plurality of pallet tags, wherein each pallet tag of the plurality of pallet tags may be configured to store data of a respective pallet and the plurality of master cases stored on the respective pallet, and may be further configured to transmit data of at least one of a respective pallet and a master case to the central data storage unit.

The plurality of master case tags may be further configured to transmit data of the respective master case to the central data storage unit only via a pallet tag of the plurality of pallet tags. Also, the plurality of pallet tags may include a plurality of pallet node tags making up a mesh network, each pallet node tag configured to receive data transmitted from a different pallet node tag and transmit the received data to at least one of another pallet node tag and the central data storage unit. Further, in a feature, only pallets of the plurality of pallets closest to the central data storage unit are configured to transmit data to the central data storage unit.

The plurality of master case tags may include a plurality of master case node tags making up a mesh network, each master case node tag configured to receive data transmitted from a different master case node tag and transmit the received data to at least one of another master case node tag and the pallet tag. In another feature, only master cases of the plurality of master cases closest to the pallet may be configured to transmit data to a pallet tag of the plurality of pallet tags.

An additional aspect provides a pallet tag for a present pallet configured to hold one or more items. The pallet tag may have a receiver configured to receive data about the one or more items from at least one of a corresponding one or more item tags and another pallet tag, and a transmitter configured to transmit the received data to at least one of a central data storage unit of a shipping container and the another pallet tag. Also, the one or more item tags may be one or more master case tags configured to transmit the data to the receiver.

Also provided may be a node processor configured to arrange the pallet tag as part of a mesh network, such that the receiver may be further configured to receive data transmitted from a different pallet tag, and such that the transmitter may be further configured to transmit the data received from the different pallet tag to the at least one of the central data storage unit and the another pallet tag.

In a further feature of the pallet tag, only the transmitter of a pallet tag of a pallet closest to the central data storage unit may be configured to transmit the data received from the different pallet or the received data to the central data storage unit. Also, the item tag may be of a different type from the pallet tag, but the item tag may be a same type as the pallet tag. The transmitter may be configured to transmit the data received from the different pallet tag only if the different pallet tag may be on a pallet immediately adjacent to the present pallet.

A further aspect provides a master case tag for a present master case configured to hold one or more items, the master case tag having a processor configured to store data of at least one of the one or more items and another master case tag, and a transmitter configured to transmit the stored data to at least one of a central data storage unit of a shipping container and the another master case tag. A receiver configured to receive data about the one or more items may be provided as well. The receiver may be configured to receive data about the one or more items by user input. Also, the user input may be at least one of keyed in and scanned in. The receiver may further be configured to receive the data about the one or more items by transmission from a corresponding one or more item tags. Additionally, the item tags correspond to items held in the present master case. The item tags may further correspond to items held in a master case other than the present master case.

In a feature, the transmitter may be further configured to transmit the stored data to a pallet tag of a pallet, and the pallet may be configured to hold the present master case. The present master case may be configured to be held by a pallet, the pallet including a pallet tag configured to receive data and transmit data to the central data storage unit.

Also provided may be a node processor configured to arrange the master case tag as part of a mesh network, such that the receiver may be further configured to receive data transmitted from a different master case tag, and such that the transmitter may be further configured to transmit the data received from the different master case tag to the at least one of the central data storage unit and the another master case tag. A node processor may be configured to arrange the master case tag as part of a mesh network, such that the receiver may be further configured to receive data transmitted from at least a different master case tag and the pallet tag, and such that the transmitter may be further configured to transmit the data received from the different master case tag to the at least one of the central data storage unit, the another master case tag, and the pallet tag.

In a feature, only the transmitter of a master case tag of a master case closest to the pallet tag may be configured to transmit the data received from the master case or the received data to the pallet tag. Also, the master case tag may be of a different type from the pallet tag, but the master case tag may be a same type as the pallet tag.

A still further aspect provides an electronic tag having a receiver configured to receive data of one or more items to be transported; a transmitter configured to transmit data of the one or more items to be transported to a central data storage unit; a memory configured to store the data of one or more items to be transported and tag identifying information; and a node processor configured to arrange the tag as part of a mesh network, such that the receiver may be further configured to receive data transmitted from a different tag, and such that the transmitter may be further configured to transmit at least one of the data received from the different tag and the tag identifying information to the at least one of the central data storage unit and another tag, wherein the data of the one or more items includes at least one of: the type of item, proximity of items to each other, ID code of the item and location of the items.

Also provided may be a power supply configured to receive power via an RF transmission. The tag may be one of RF, RFID, WiFi, Bluetooth, Bluetooth Low Energy, Active Bat, NFC and Foundation Fieldbus H1. Also a unique tag identifier stored in the memory may be provided to the tag. The memory may be configured to store a message concerning the data of the one or more items. The message may also be encoded or encrypted. Also provided may be a tamper-evident housing configured to house the receiver, the transmitter, the memory and the node processor.

Also provided in yet another aspect is a method of authenticating the contents of a shipping container, the contents including items contained in a plurality of master cases, the master cases stored on a plurality of pallets, the pallets stored in the shipping container, the method including receiving and storing, in a plurality of master case electronic tags, data of the items, receiving, in a plurality of pallet electronic tags, data of the master cases; iteratively scanning, by a processor (including but not limited to a central data storage unit), the data of the master cases; comparing, by the processor, previously-scanned data of the master cases with subsequently-scanned data of the master cases; receiving, by the processor, data of the pallets; iteratively scanning, by the processor, the data of the pallets; comparing, by the processor, previously-scanned data of the pallets with subsequently-scanned data of the pallets; and recording an event by the processor, when at least one of: the compared data of the master cases exceeds a predetermined difference; and the compared data of the pallets exceeds a predetermined difference.

In the method, the receiving data of the master cases may occur only in master cases closest to the pallet; and the receiving data of the pallets may occur only in pallets closest to a central data storage unit. Also, the receiving data of the pallets may include receiving data of all items in the shipping container. In a feature, the receiving data of the master cases and the receiving data of the pallets occurs without opening the shipping container and/or disturbing the contents of the pallets and or master cases.

The plurality of master case electronic tags and the plurality of pallet electronic tags cases may be part of a mesh node network connected to a central data storage unit. Also, the data of the master cases may include the relative position among the master cases; and the data of the pallets may include the relative position among the pallets. The receiving and storing data of the items may be performed by user input. Also, the user input may be at least one of keyed in and scanned in.

Another aspect provides at least one computer that executes an application authenticating the contents of a shipping container, the contents including items contained in a plurality of pallets, the master cases stored on a plurality of pallets, the pallets stored in the shipping container, the at least one computer having a memory that stores the application, and a processor that executes the application, wherein the application, when executed by the processor, causes the computer at least to: receive and store data of the items; receive data of the master cases; iteratively scan the data of the master cases; compare previously-scanned data of the master cases with subsequently-scanned data of the master cases; receive data of the pallets; iteratively scan the data of the pallets; compare previously-scanned data of the pallets with subsequently-scanned data of the pallets; and record an event when at least one of: the compared data of the master cases exceeds a predetermined difference; and the compared data of the pallets exceeds a predetermined difference.

A further aspect provides at least one non-transitory computer readable medium for authenticating the contents of a shipping container, the contents including items contained in a plurality of master cases, the master cases stored on a plurality of pallets, the pallets stored in the shipping container, the medium having a receiving and storing code segment which, when executed by the computer, receives and stores data of the items; a receiving code segment which, when executed by the computer, receives data of the master cases; an iteratively scanning code segment which, when executed by the computer, iteratively scans the data of the master cases; a comparing code segment which, when executed by the computer, compares previously-scanned data of the master cases with subsequently-scanned data of the master cases; a receiving code segment which, when executed by the computer, receives data of the pallets; an iteratively scanning code segment which, when executed by the computer, iteratively scans the data of the pallets; a comparing code segment which, when executed by the computer, compares previously-scanned data of the pallets with subsequently-scanned data of the pallets; and a recording code segment which, when executed by the computer, records an event when at least one of: the compared data of the master cases exceeds a predetermined difference; and the compared data of the pallets exceeds a predetermined difference.

Yet another aspect provides a system for authenticating the contents of a shipment, the contents including items contained in a plurality of master cases, the master cases stored on a plurality of pallets, the pallets stored in a plurality of shipping containers, the shipping containers located on a transporter, the system having a container data storage unit located in each shipping container of the plurality of shipping containers and configured to receive data transmitted thereto and to transmit container data storage unit data to a transporter data storage unit, and a plurality of electronic tags located in each shipping container and configured to store data of the items, and further configured to transmit data of the items to each container data storage unit, wherein the a transporter data storage unit may be configured to store the container data storage unit data. Also, the container data storage unit data includes GPS data of the location of a container data storage unit.

Other exemplary embodiments and advantages of the present invention may be ascertained by reviewing the present disclosure and the accompanying drawings; and the above description should not be considered to limit the scope of the present disclosure.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout the several views of the drawings:

FIG. 7 is a schematic view of a pallet arrangement according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
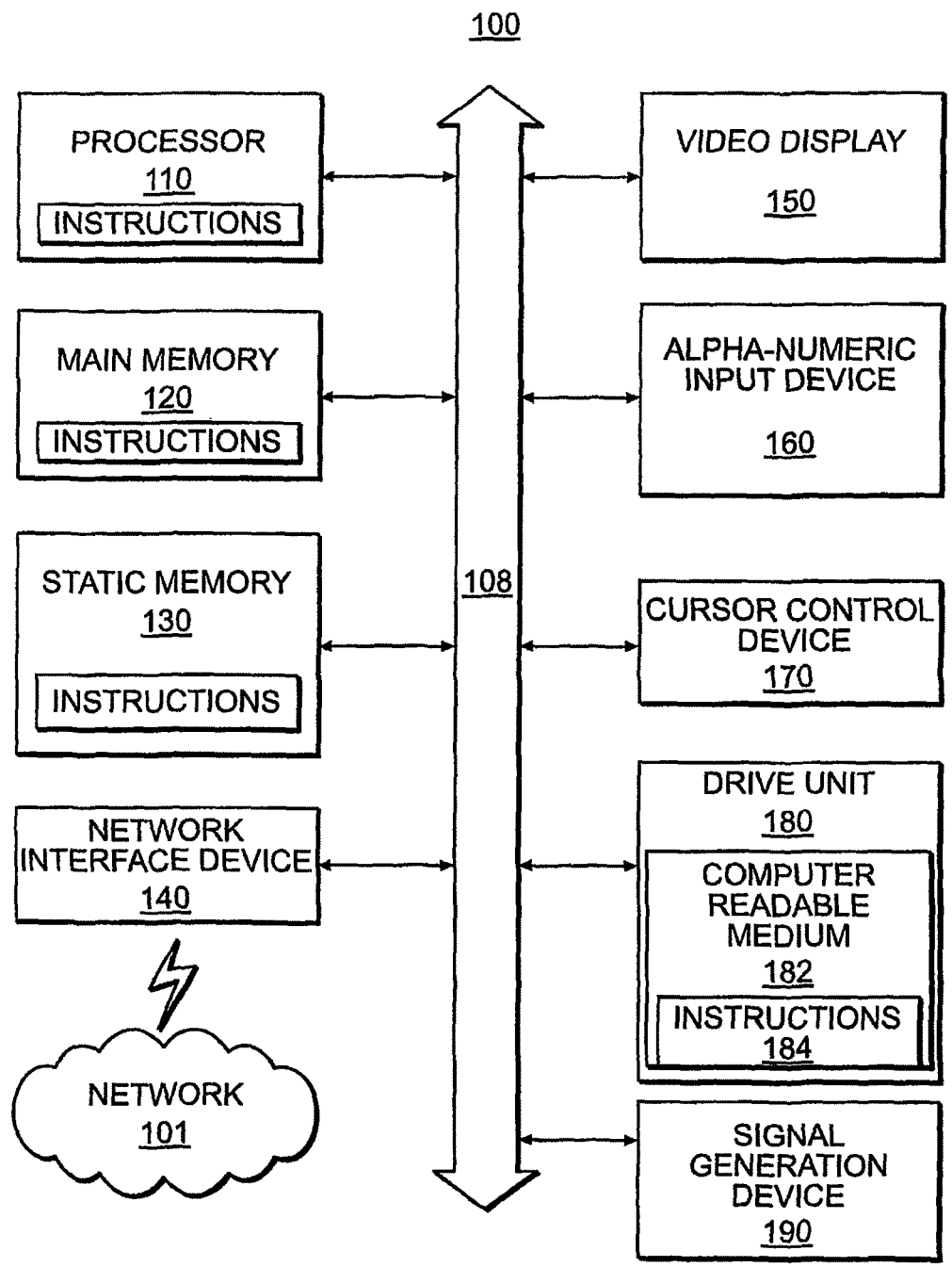
FIG. 1 is an illustrative embodiment of a general purpose computer system according to an aspect of the present disclosure.

Referring to the drawings wherein like characters represent like elements, FIG. 1 is an illustrative embodiment of a general purpose computer system, on which a system and method for a master case tracking mesh for data transmission in a highly shielded environment can be implemented, which is shown and is designated 100. The computer system (also referred to as a "central data storage unit" or "CDSU") 100 can include a set of instructions that can be executed to cause the computer system 100 to perform any one or more of the methods or computer based functions disclosed herein. The computer system 100 may operate as a stand-alone device or may be connected, for example, using a network 101 including but not limited to a mesh network, to other computer systems or peripheral devices, including but not limited to electronic tags.

In a networked deployment, the computer system may operate in the capacity of a server or as a client user computer in a server-client user network environment, or as a peer computer system in a peer-to-peer (or distributed) network environment, including but not limited to femtocells or microcells. The computer system 100 can also be implemented as or incorporated into various devices, such as a personal computer (PC), a tablet device, a set-top box (STB), a personal digital assistant (PDA), a smartphone, a mobile device, a global positioning satellite (GPS) device, a palmtop computer, a laptop computer, a desktop computer, a communications device, a wireless telephone, smartphone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display (video display unit) 150, such as a liquid crystal display (LCD), an organic light emitting diode (OLED), a flat panel display, a solid state display, or a cathode ray tube (CRT). Additionally, the computer system 100 may include an input (input device) 160, such as a keyboard or touchscreen, and a cursor control/pointing controller (cursor control device) 170, such as a mouse, trackball, touchscreen, touchpad or trackpad. The computer system 100 can also include storage, such as a disk drive unit 180, a signal generator (signal generation device) 190, such as a speaker or remote control, and a network interface (e.g., a network interface device) 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which one or more sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 104 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video and/or data over the network 101. Further, the instructions 184 may be transmitted and/or received over the network 101 via the network interface device 140.

Figure 2:
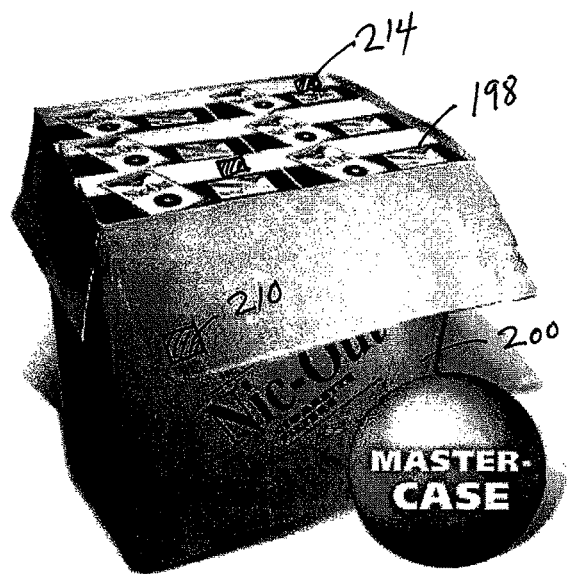
FIG. 2 is a perspective view of a master container according to an aspect of the present disclosure.
Figure 3:
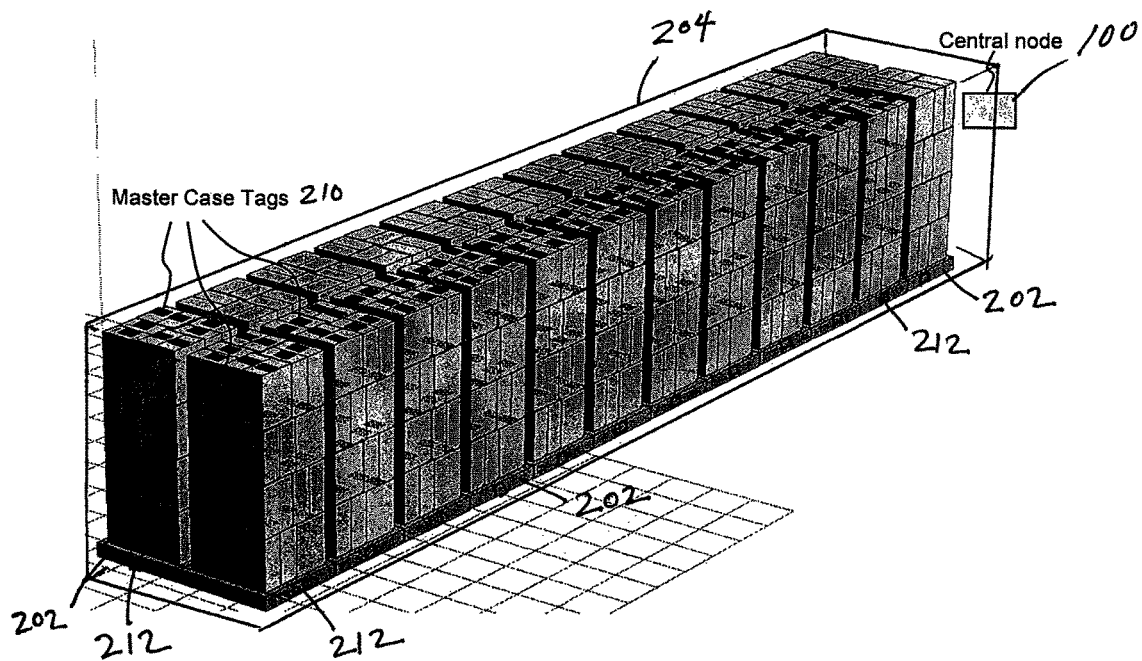
FIG. 3 is a cutaway view of a shipping container according to an aspect of the present disclosure.

FIG. 2 shows cigarette cartons 198, a plurality of which are packed in a master case (also referred to as a master carton) 200. As shown in FIG. 3, the master cases 200 are typically loaded onto a pallet 202 (although this may not be required in certain aspects). The pallets 202 are then loaded into a cargo/shipping container 204. While the figures relate to cigarettes, it is understood that the present invention may be used in conjunction with any transportable goods, including but not limited to timepieces, currency, negotiable instruments, mined products, beverages, medicine, food, machine parts and electronic components, cosmetics, consumer products, industrial products, wholesale products and other tobacco products. Also, while FIG. 3 shows a cargo container in the form of a shipping container, it is understood that the container can be any kind of container for transporting goods, and can be configured to be transported by rail, truck, ship or any suitable vehicle. Alternatively, the container 204 can be located in or be part of a stationary warehouse or other building.

The master cases 200 each include an electronic master case tag (or MC tag) 210 and the pallets 202 each include an electronic pallet tag (or P tag) 212. Additionally, the items 198 in the master case 200 may each include an electronic item tag (or I tag) 214, either on the cigarette cartons or on the individual packs of cigarettes. The tags 210, 212 and 214 serve to provide data related to the shipment or to the tag itself (e.g. signal strength, battery age, power level, tag ID code, the number of items, type of item being transported, shipment date, destination and the like).

The tags 210, 212 and 214 and are able to transmit and/or store the data. It noted that as used herein, in addition to referring to saving data to a memory, the term "store" also refers to mere transmission of data by a tag 210, 212 and 214 without saving the data to a memory (such that the tag functions as a mere relay). The tags 210, 212 and 214 may also be configured to act as a node in a mesh network of tags 210, 212 and 214, such that each tag may serve as a relay supporting its own data and that of neighboring tags. Each tag 210, 212 and 214 may have a unique identification code (ID code), or alternatively groups of tags may share the same ID code (e.g., the same products may share the same ID code). A tag 210, 212 and 214 may be read from several meters to beyond the line of sight of another tag of CDSU. The tags 210, 212 and 214 may be passive, active, or semi-passive. The mesh network of the disclosure allows reliable communication among the tags 210, 212 and 214 and between the tags 210, 212 and 214 and the CDSU 100, even when the items are shielded (e.g., in the case of aluminum foil packaging which covers cigarettes, or in the case of equipment having other types of protective shielding). However, it is understood that one or more amplifiers to amplify the signals transmitted by the tags 210, 212 and 214 and/or the CDSU 100 may be provided. The mesh network also allows the contents of a shipping container 204 to be verified and monitored without opening the shipping container, which otherwise could compromise the integrity of the shipment.

The tags 210, 212 and 214 may be of any suitable type, including but not limited to RF, RFID, WiFi, Bluetooth, Bluetooth Low Energy (BLE), Active Bat, near field communication, and Foundation Fieldbus H1. The tags 210, 212 and 214 may also be autonomous in terms of a power supply such that they may receive power via electromagnetic induction, RF transmission, a rechargeable battery, micro energy capture, solar power, heat transfer, geothermal, energy harvesting and the like. It is also noted that the MC tags 210, P tags 212 and I tags 214 may all be the same type, or the MC tags 210, P tags 212 and I tags 214 may be of types different from each other. For example, the MC tags 210 may be RFID tags, while the P tags may be BLE tags. Also, the types of tags may vary within each of the MC tags 210, P tags 212 and I tags 214. For example, the MC tags 210 for master cases holding cigarettes may be RFID tags, while the MC tags for master cases holding timepieces may be WiFi tags.

The tags 210, 212 and 214 are configured to transmit the data (either directly or indirectly, depending on the configuration of the mesh network) to the CDSU 100. The CDSU 100 may be affixed to the inside and/or the outside of the container (e.g., as discussed above, the CDSU may be divided into two or more parts, one being affixed to the inside of the container 204, and another part being affixed to the outside of the container), and as discussed above, may be remotely queried (e.g., in the event of suspected cargo tampering with explosives). Further, when using two or more CDSUs 100—one CDSU may be mounted on the inside of the container (e.g., an inner CDSU) and another CDSU may be mounted on the outside of the container (e.g., an outer CDSU) which may or may not be in communication with the inner CDSU. It is noted that an amplifier can be provided to either or both of the inner and outer CDSU to amplify the signals to be transmitted.

It is also noted that data relating to the entire contents of the container 204 may be transmitted to the CDSU 100, or alternatively, only certain data of certain contents of the container may be transmitted to the CDSU (for example, for security purposes and/or when a recipient of a shipment is provided access to data pertaining only to the recipient's items, thereby hiding from the recipient the data relating to other items not destined for the recipient). Further, the present invention may be configured to provide limited access to the data for certain users (e.g., the recipient as described above) or to provide full access for other users (e.g., customs agents).

Figure 4:
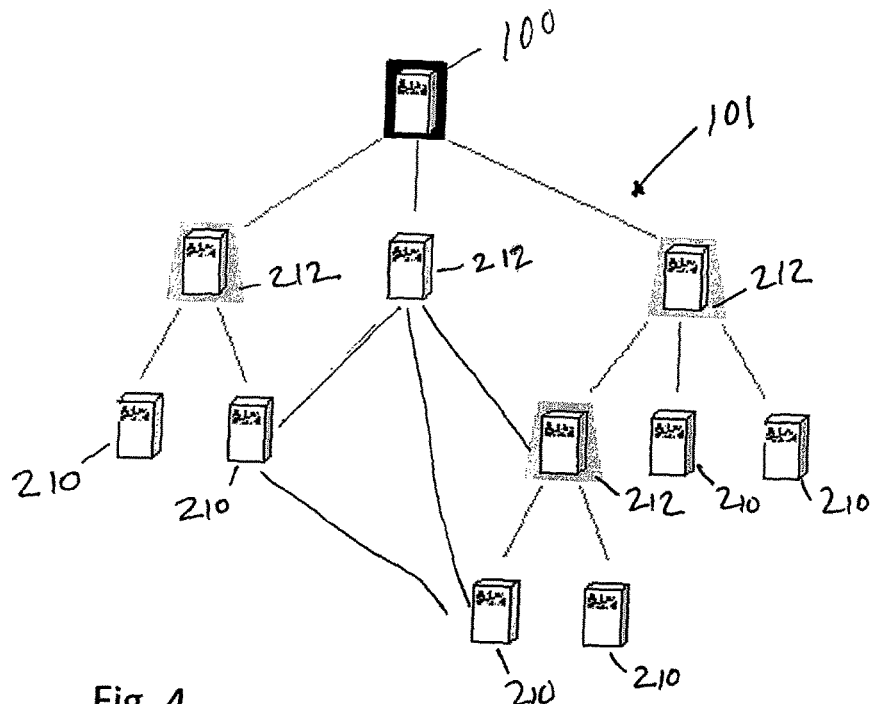
FIG. 4 is a schematic view of a mesh network according to an aspect of the present disclosure.
Figure 5:
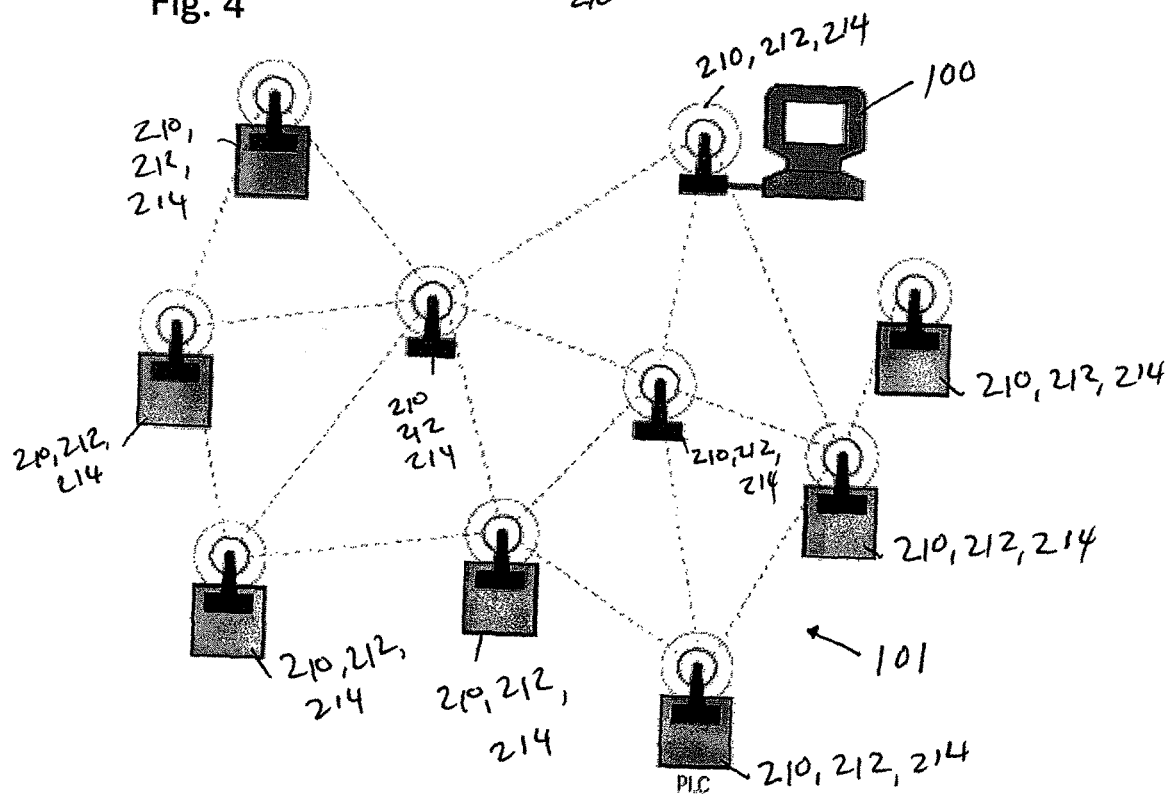
FIG. 5 is a schematic view of a mesh network according to another aspect of the present disclosure.

The mesh network 101 is shown in FIGS. 4 and 5 in different aspects, and it is noted that the mesh network of the invention may be employed in many different configurations. For example, the mesh network 101 may be self-organized such that the tags 210, 212 and 214 can self-identify and identify their neighboring tags and configure communications amongst each other. The mesh network 101 can also be organized where each of the tags 210, 212 and 214 can have a preprogrammed operation mode in accordance with specific rules.

Figure 6:
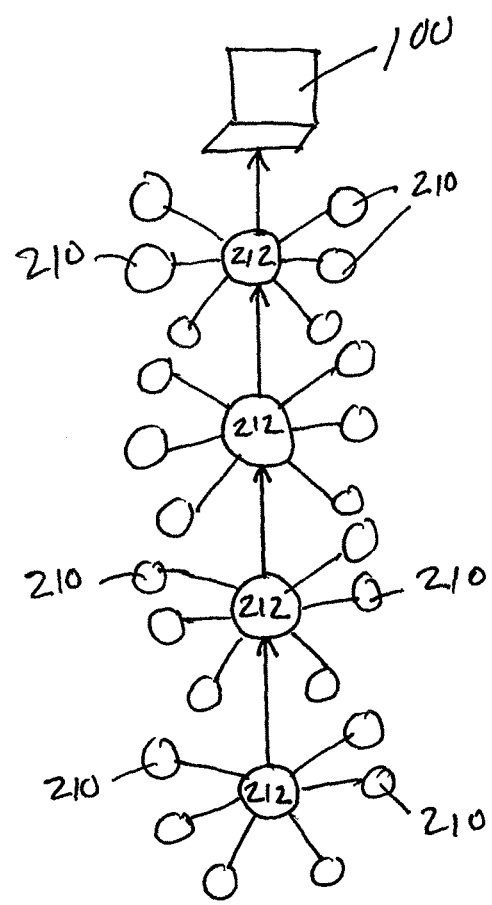
FIG. 6 is a schematic view of a mesh network according to a further aspect of the present disclosure.

Also, the mesh network 101 may be in the form of a fully connected mesh in which each tag can communicate with every other tag (as well as the CDSU 100) in the network. Alternatively, in order to reduce network traffic, the MC tags 210 can communicate with the CDSU 100 only via a P tag 212, as shown in FIG. 4. Further, any of the MC tags 210, P tags 212 and I tags 214 can communicate with the CDSU 100 as well as each other, while not being fully interconnected, as shown in FIG. 5. Additionally, as shown in FIG. 6, in another aspect, a present P tag 212 is only able to communicate with other P tags and M tags 210 corresponding to master cases 200 stored on the pallet (the present pallet) 202 corresponding to the present P tag. In other words, only data relating to master cases 200 stored on a particular pallet 202 is transmitted to the P tag 212 affixed to that particular pallet, and the P tag 212 affixed to that particular pallet only transmits data to (other pallets and) MC tags affixed to master cases stored on that particular pallet.

Further, in another aspect and also as shown in FIG. 6, data is transmitted from a P tag 212 farthest from the CDSU 100 to along other P tags to the P tag closest to the CDSU, such that only the P tag closest to the CDSU transmits data to (and receives data from) the CDSU. Thus, this closest P tag transmits the entire data relating to the contents of the container 201 to the CDSU 100. In aspects where pallets 202 or P tags 212 are not used, the MC tags 210 may communicate directly with the CDSU 100, and may further be arranged such that only the MC tag(s) closest to the CDSU transmits data to (and receives data from) the CDSU. Still further, where pallets 202 and P tags 212 are used, the both the MC tag(s) 210 and P tags closest to the CDSU transmits data to (and receives data from) the CDSU. In aspects where pallets 200 and master cases 202 are not used in the container 204, the I tags 214 may communicate directly with the CDSU 100, and may further be arranged such that only the I tag(s) closest to the CDSU transmits data to (and receives data from) the CDSU. It is noted that in an aspect, a P tag 212 has more memory than an MC tag 210 or an I tag 210, because the P tag collect the data of not only the master cases (and items) held by that pallet 202, but also the data coming from neighboring pallets. Alternatively, the P tag has less memory than or equal memory to an MC tag 210 and/or an I tag 210.

In an aspect of the disclosure, in addition to a global mesh network 101 for a container, the mesh network can be made up of separate networks joined by a single node. For example, the mesh network can include a master case mesh made up of MC tags 210, a pallet mesh made up of P tags 212 and/or an item mesh made up of I tags 210, all of which, or only one or two of which meshes can communicate with the CDSU 100. As such the pallet mesh can communicate with the master case mesh (and/or the item mesh) by a single node, and the item mesh can communicate with the master case mesh (and/or the pallet mesh) by a single node. It is also noted that each mesh may be configured to directly communicate with the CDSU 100.

It is also noted that the mesh network 101 can include one or more tags 210, 212 and 214 having geolocation capabilities (using, e.g., global positioning systems, or GPS) and/or a CDSU 100 having such geolocation capabilities. Further the CDSU 100 may be part of a larger CDSU mesh network such that CDSUs of different storage containers can communicate with a master data storage unit, e.g., on a vessel, and/or monitor their GPS location relative to each other and/or the master data storage unit, so that irregularities of shipments on the vessel can be monitored, e.g., in the event that a container is moved or removed from the vessel. It is appreciated that the larger CDSU mesh network can be employed among containers in a stationary structure as well.

In an aspect of the disclosure, a shipment may be prepared as follows. A user manually enters data related to the content of a master case into an MC tag 210, which may be performed by keying in the information into a computer for programming a connected MC tag, or by using a code reader or other suitable type of scanner. Such preparation is not without risk, because during the transport of the container 204 the genuine article in the master case could be replaced a by a counterfeit article. To avoid such a situation, a tamper proof or tamper evident structure as part of the tag or elsewhere on the master case 200 can protect access to the master case. It is noted that in the event an MC tag 210 detects tampering via a disturbance (e.g, breaking, bending, disorienting, and the like) of the tamper proof or tamper evident structure, the MC tag may record the event in the CDSU and/or MC tag.

It is further noted that the MC tag 210, as well as the other tags 212, 214 can operate in two or more different modes—one mode where the tag can accept user input, and another mode where the tag is prevented from accepting user input (e.g., to prevent tampering or to avoid crosstalk). These modes may be user-triggered.

In another aspect, a way to secure the contents of the master case 200 is to provide a master case tag 210 and/or an item tag 214 capable of: capturing data related to the master case 200 and the environment surrounding the master case, storing data related to the master case 200 as well as data related to neighboring master cases, and transmitting the stored and/or captured data. In this aspect, the data related to the contents of the master case is provided by the item tags 214 on items 198 within the master case. Thus, the I tag 214 automatically communicates the data relating to the item 198 to the MC tag 210, so there is no need for a user (i.e., a human operator) to input the data relating to the contents of the master case.

The connection between the number of the items contained or not contained in a master case 200, and the items each having an I tag 214 securely communicating MC tag 210 can allow diversion analysis or avoid a replacement of a genuine item with a counterfeit item during the travel of the container 204.

In an aspect of the disclosure, the CDSU 100 may be configured to receive data from not only the user's own tags 210, 212 and 214, but from tags of an entity other than the user (e.g., an unaffiliated shipper). As used herein, the term 'unaffiliated' means that one user is not directed and/or controlled by another user. For example, in an aspect, a user such as shipper Company X controls one or more containers 204 and the CDSU(s) 100 and/or tags 210, 212 and 214 therein. Company X's CDSU 100 and/or tags 210, 212 and 214 could be configured to identify signatures (i.e. emitted data) of tags from other users (e.g., Company Y) in the neighborhood of Company X's CDSU and/or tags, and store and/or transmit data related to these signatures to the CDSU or other device. In the event the signature(s) of Company Y's tags are known (or are known to be within a certain range), Company X's CDSU 100 and/or tags 210, 212 and 214 could be configured to identify signatures within a certain signature range.

Moreover, this aspect confers further advantages. For example, Company Y can contract with Company X, so that Company X's CDSU 100 and/or tags 210, 212 and 214 are arranged (e.g., programmed) to additionally or alternatively monitor Company Y's tags 210, 212 and 214 (e.g., for purposes of system redundancy and/or in the event Company Y's CDSU is not able to monitor its own tags). In this way, Company X can monitor Company Y's tags 210, 212 and 214. For example, in the case of Company Y contracting with Company X so that Company X's CDSU 100 and/or tags 210, 212 and 214 monitor Company Y's tags 210, 212 and 214, Company Y would forward data affiliated with its own tags to Company X, and then Company X's CDSU 100 and/or tags 210, 212 and 214 are programmed with this data so that Company X's CDSU and/or tags can accurately scan and identify Company Y's tags. Also, Company X's CDSU 100 and/or tags 210, 212 and 214 may be programmed so that Company X's CDSU and/or tags search for or scan for signatures of tags other than Company X's own tags. An advantage of such an arrangement allows a cargo ship to more easily monitor more of its shipping contents (e.g., if Company Y's pallet has been moved or otherwise tampered with, Company X's CDSU 100 and/or tags 210, 212 and 214 would register the P tag 212 with Company X's CDSU and alert the appropriate entity). This way, the monitoring extends beyond Company X's own tags 210, 212 and 214, for even greater accuracy in tracking, e.g., when performing diversion analysis.

In a further aspect, in the case of a missing child, Company X's CDSU 100 and/or tags 210, 212 and 214 can be arranged to search for the missing child by 'sniffing' (searching) for the signature of a tag traveling with the child (e.g. such as a tag affixed to the child's shoe, jewelry, backpack, or stuffed animal). In the case of a tag traveling with the child (child tag), if the information associated with the child tag (e.g., frequency or other unique data) is known, then Company X's CDSU 100 and/or tags 210, 212 and 214 are programmed with this information to identify the specific child tag and alert the appropriate entity once identified. On the other hand, if the information associated with the child tag is not known, then Company X's CDSU 100 and/or tags 210, 212 and 214 are programmed to search for or scan tags other than Company X's own tags. Also, in order to reduce 'noise' CDSU 100 and/or tags 210, 212 and 214 can be programmed to search for tags within a certain signature range.

Figure 8:
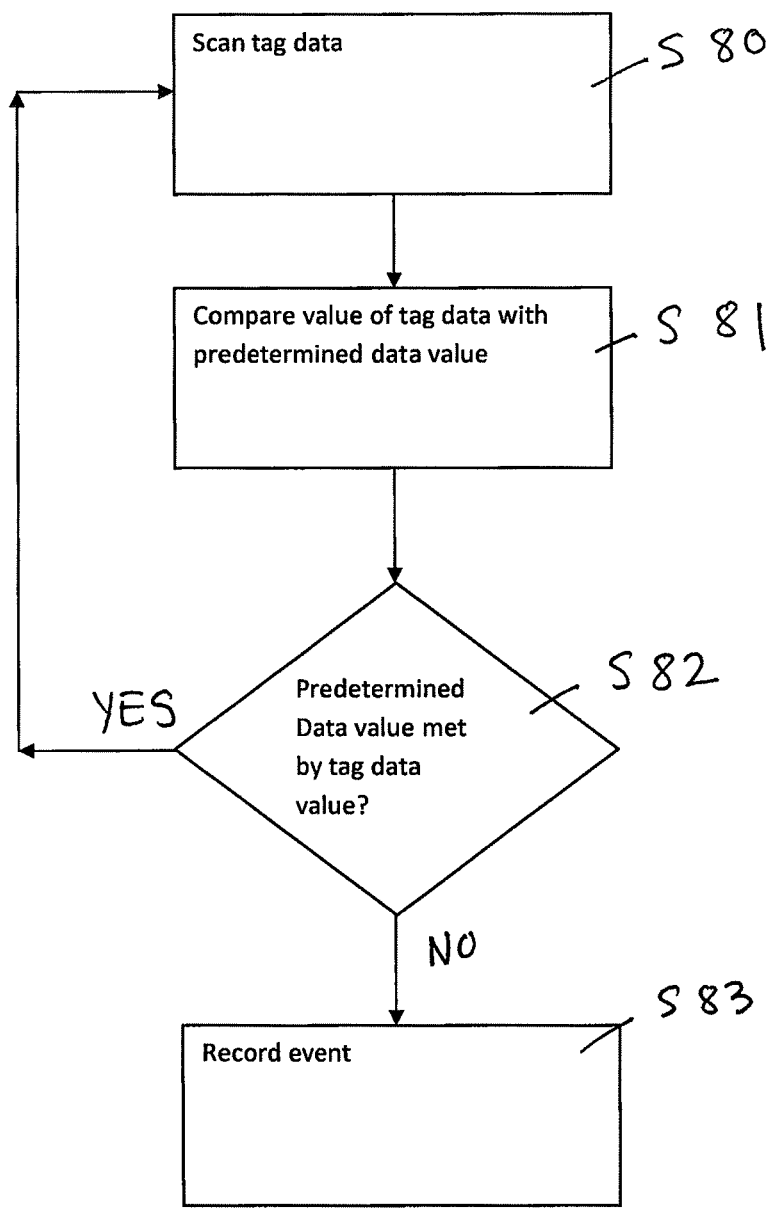
FIG. 8 is a flowchart of the tracking system according to an aspect of the present disclosure.

FIG. 8 shows a flowchart of an aspect of the tracking system of the disclosure. At step S80, data from any or all tags 210, 212 and 214 are scanned. Scanning may be performed by the CDSU 100 or another tag. Next, at step S81, the scanned value of the tag(s) are compared to a predetermined data value. The predetermined data value could be related to, for example, the distance between tags (and thus the distance between items, master cases and/or pallets) based on, e.g., signal strength; presence or absence of tags (and therefore items, master cases or pallets); and/or tag identity. If at step S82 the predetermined value (which could be an exact value or a range) is met by the comparison, then the processing returns to step S80 and the tags are again scanned. In this way, the data is iteratively scanned. If, however, the predetermined value is not met by the comparison, then at step S83 an event is recorded either in the CDSU 100 or in the memory of a tag 210, 212 and 214. It is noted that the tags 210, 212 and 214 may include a memory for recording a message or other alert (in audio, visible or other form) relating to the event recorded at S83. It is also noted that the message may be encoded or encrypted in the CDSU 100 or in the memory of a tag 210, 212 and 214 so that only authorized entities may access the message. It is also noted that the CDSU 100 may periodically query any or all of the tags 210, 212 and 214, and/or the tags may initiate data transmission to the CDSU, which stands by to receive such data transmissions.

As an example, items 198 in the form of one hundred boxes of cigarettes each having a tag 214 unique to each box are in regular communication MC tag 210 of the master case 200 in which the cigarette boxes are stored. If removal or replacement of a box occurs during the travel of the container 204, the CDSU 100 or MC tag would register that a box has been removed (noting an absent tag 214) or that a box has been tampered with (noting an incorrect tag 214), and an event would be recorded in the CDSU or MC tag. In this way, the time of adulteration as well as (using GPS data) the location of the adulteration can be determined and logged.

FIG. 7 shows another example of a way in which diversion analysis of the disclosure may be performed. Nine pallets 202 are shown as being arranged in predetermined positions (i)-(ix) within a container 204 at a departure port. Numbers 1-9 represent the data (e.g., ID code and tag frequency) of each pallet tag 212. During transport, the pallets in positions (v), (viii) and (ix) are switched within the container. The CDSU 100 or the tags 210, 212 and 214 prompt the recording of an event (e.g., the pallet tags having different neighboring pallet tags not meeting the predetermined value), and letters A-E represent recorded messages (which may or not be encoded and/or encrypted) stored in each pallet tag representing the event (although it is appreciated that only the messages or only the recording the event may be implements). It is noted that one or more of these messages may alternatively or additionally be stored in the CDSU 100. Further, these messages may include geolocation data to identify where during shipment the event occurred. It is further noted that the above description related to FIG. 7 relates to the positioning of pallets 202 relative to the container 204, it is understood that the description may also or alternatively be adapted such that the disclosure relates to the positioning of master cases 200 relative to the pallets 202 and/or the container 204, and/or to the positioning of the items 198 relative to the master cases 200, pallets 202 and/or the container 204.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., WiFi, Bluetooth, femtocell, microcell and the like) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is not intended be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The following is a non-exhaustive list of embodiments of the invention that are or may be claimed.

Embodiment 1

A shipping container for holding items to be transported therein, the shipping container comprising:
a central data storage unit configured to receive data transmitted thereto; and
a plurality of electronic tags configured to store data of the items, and further configured to transmit data of the items to the central data storage unit.

Embodiment 2

The shipping container of Embodiment 1, wherein the plurality of electronic tags comprise a plurality of node tags making up a mesh network, each node tag configured to receive data transmitted from a different node tag and transmit the received data to at least one of another node tag and the central data storage unit.

Embodiment 3

The shipping container of Embodiment 1, wherein the data of the items includes at least one of: the type of item, proximity of items to each other, ID code and location of the items.

Embodiment 4

The shipping container of Embodiment 1, wherein the plurality of electronic tags include at least one of RF, RFID, WiFi, Bluetooth, Bluetooth Low Energy, Active Bat, near field communication, and Foundation Fieldbus H1.

Embodiment 5

The shipping container of Embodiment 1, wherein the items are at least one of tobacco products, timepieces, beverages, medicine, food, machine parts and electronic components.

Embodiment 6

The shipping container of Embodiment 1, wherein the plurality of electronic tags is configured to transmit data of the entirety of items held in the shipping container to the central data storage unit.

Embodiment 7

The shipping container of Embodiment 1, wherein the central data storage unit is mounted to an exterior surface of the shipping container.

Embodiment 8

The shipping container of Embodiment 1, wherein each electronic tag of the plurality of electronic tags includes a unique identifier code.

Embodiment 9

The shipping container of Embodiment 1, further comprising an amplifier configured to amplify a signal of data transmitted to the central data storage unit.

Embodiment 10

The shipping container of Embodiment 1, wherein:
the items are configured to be stored in a plurality of master cases configured to be stored in the shipping container; and
the plurality of electronic tags comprises a plurality of master case tags, wherein each master case tag of the plurality of master case tags is configured to store data of a respective master case, and is further configured to transmit data of a respective master case to the central data storage unit.

Embodiment 11

The shipping container of Embodiment 10, wherein the plurality of master case tags comprise a plurality of master case node tags making up a mesh network, each master case node tag configured to receive data transmitted from a different master case node tag and transmit the received data to at least one of another master case node tag and the central data storage unit.

Embodiment 12

The shipping container of Embodiment 10, wherein:
the master cases are configured to be stored on a plurality of pallets; and the plurality of electronic tags comprises a plurality of pallet tags, wherein each pallet tag of the plurality of pallet tags is configured to store data of a respective pallet and the plurality of master cases stored on the respective pallet, and is further configured to transmit data of at least one of a respective pallet and a master case to the central data storage unit.

Embodiment 13

The shipping container of Embodiment 12, wherein the plurality of master case tags and the plurality of pallet tags comprise a plurality of node tags making up a mesh network, each node tag configured to receive data transmitted from a different node tag and transmit the received data to at least one of another node tag and the central data storage unit.

Embodiment 14

The shipping container of Embodiment 13, wherein the mesh network is configured to transmit data of the entirety of items held in the shipping container to the central data storage unit.

Embodiment 15

The shipping container of Embodiment 12, wherein:
each master case tag of the plurality of master case tags comprises a memory;
each pallet tag of the plurality of pallet tags comprises a memory; and
the memory of a pallet tag of the plurality of pallet tags is larger than the total combined memory of master case tags of respective master cases stored on the pallet.

Embodiment 16

The shipping container of Embodiment 10, wherein only master cases of the plurality of master cases closest to the central data storage unit are configured to transmit data to the central data storage unit.

Embodiment 17

The shipping container of Embodiment 12, wherein the plurality of master case tags are tags of a different type from the plurality of pallet tags.

Embodiment 18

The shipping container of Embodiment 12, wherein the plurality of master case tags are tags of a same type as the plurality of pallet tags.

Embodiment 19

The shipping container of Embodiment 1, wherein:
the items are configured to be stored on a plurality of pallets; and
the plurality of electronic tags comprises a plurality of pallet tags, wherein each pallet tag of the plurality of pallet tags is configured to store data of a respective pallet, and is further configured to transmit data of a respective pallet to the central data storage unit.

Embodiment 20

The shipping container of Embodiment 19, wherein the plurality of pallet tags comprise a plurality of pallet node tags making up a mesh network, each pallet node tag configured to receive data transmitted from a different pallet node tag and transmit the received data to at least one of another pallet node tag and the central data storage unit.

Embodiment 21

The shipping container of Embodiment 19, wherein only pallets of the plurality of pallets closest to the central data storage unit are configured to transmit data to the central data storage unit.

Embodiment 22

A shipping container for holding items, the items contained in a plurality of master cases, the master cases stored on a plurality of pallets, the pallets stored in the shipping container, the shipping container comprising:
a central data storage unit configured to receive data transmitted thereto;
a plurality of master case tags, wherein each master case tag of the plurality of master case tags is configured to store data of a respective master case, and is further configured to transmit data of a respective master case to the central data storage unit; and
a plurality of pallet tags, wherein each pallet tag of the plurality of pallet tags is configured to store data of a respective pallet and the plurality of master cases stored on the respective pallet, and is further configured to transmit data of at least one of a respective pallet and a master case to the central data storage unit.

Embodiment 23

The shipping container of Embodiment 22, wherein the plurality of master case tags is further configured to transmit data of the respective master case to the central data storage unit only via a pallet tag of the plurality of pallet tags.

Embodiment 24

The shipping container of Embodiment 23, wherein the plurality of pallet tags comprise a plurality of pallet node tags making up a mesh network, each pallet node tag configured to receive data transmitted from a different pallet node tag and transmit the received data to at least one of another pallet node tag and the central data storage unit.

Embodiment 25

The shipping container of Embodiment 24, wherein only pallets of the plurality of pallets closest to the central data storage unit are configured to transmit data to the central data storage unit.

Embodiment 26

The shipping container of Embodiment 23, wherein the plurality of master case tags comprise a plurality of master case node tags making up a mesh network, each master case node tag configured to receive data transmitted from a different master case node tag and transmit the received data to at least one of another master case node tag and the pallet tag.

Embodiment 27

The shipping container of Embodiment 26, wherein only master cases of the plurality of master cases closest to the pallet are configured to transmit data to a pallet tag of the plurality of pallet tags.

Embodiment 28

A pallet tag for a present pallet configured to hold one or more items, the pallet tag comprising:
a receiver configured to receive data about the one or more items from at least one of a corresponding one or more item tags and another pallet tag; and
a transmitter configured to transmit the received data to at least one of a central data storage unit of a shipping container and the another pallet tag.

Embodiment 29

The pallet tag of Embodiment 28, wherein the one or more item tags is one or more master case tags configured to transmit the data to the receiver.

Embodiment 30

The pallet tag of Embodiment 28, further comprising a node processor configured to arrange the pallet tag as part of a mesh network, such that the receiver is further configured to receive data transmitted from a different pallet tag, and such that the transmitter is further configured to transmit the data received from the different pallet tag to the at least one of the central data storage unit and the another pallet tag.

Embodiment 31

The pallet tag of Embodiment 30, wherein only the transmitter of a pallet tag of a pallet closest to the central data storage unit is configured to transmit the data received from the different pallet or the received data to the central data storage unit.

Embodiment 32

The pallet tag of Embodiment 28, wherein the item tag is of a different type from the pallet tag.

Embodiment 33

The pallet tag of Embodiment 28, wherein the item tag is a same type as the pallet tag.

Embodiment 34

The pallet tag of Embodiment 30, wherein the transmitter is configured to transmit the data received from the different pallet tag only if the different pallet tag is on a pallet immediately adjacent to the present pallet.

Embodiment 35

A master case tag for a present master case configured to hold one or more items, the master case tag comprising:
a processor configured to store data of at least one of the one or more items and another master case tag; and
a transmitter configured to transmit the stored data to at least one of a central data storage unit of a shipping container and the another master case tag.

Embodiment 36

The master case tag of Embodiment 35, further comprising a receiver configured to receive data about the one or more items.

Embodiment 37

The master case tag of Embodiment 36, wherein the receiver is configured to receive data about the one or more items by user input.

Embodiment 38

The master case tag of Embodiment 37, wherein the user input is at least one of keyed in and scanned in.

Embodiment 39

The master case tag of Embodiment 36, wherein the receiver is configured to receive the data about the one or more items by transmission from a corresponding one or more item tags.

Embodiment 40

The master case tag of Embodiment 39, wherein the item tags correspond to items held in the present master case.

Embodiment 41

The master case tag of Embodiment 40, wherein the item tags further correspond to items held in a master case other than the present master case.

Embodiment 42

The master case tag of Embodiment 35, wherein the transmitter is further configured to transmit the stored data to a pallet tag of a pallet.

Embodiment 43

The master case tag of Embodiment 42, wherein the pallet is configured to hold the present master case.

Embodiment 44

The master case tag of Embodiment 35, wherein the present master case is configured to be held by a pallet, the pallet including a pallet tag configured to receive data and transmit data to the central data storage unit.

Embodiment 45

The master case tag of Embodiment 36, further comprising a node processor configured to arrange the master case tag as part of a mesh network, such that the receiver is further configured to receive data transmitted from a different master case tag, and such that the transmitter is further configured to transmit the data received from the different master case tag to the at least one of the central data storage unit and the another master case tag.

Embodiment 46

The master case tag of Embodiment 44, further comprising a node processor configured to arrange the master case tag as part of a mesh network, such that the receiver is further configured to receive data transmitted from at least a different master case tag and the pallet tag, and such that the transmitter is further configured to transmit the data received from the different master case tag to the at least one of the central data storage unit, the another master case tag, and the pallet tag.

Embodiment 47

The master case tag of Embodiment 46, wherein only the transmitter of a master case tag of a master case closest to the pallet tag is configured to transmit the data received from the master case or the received data to the pallet tag.

Embodiment 48

The master case tag of Embodiment 44, wherein the master case tag is of a different type from the pallet tag.

Embodiment 49

The pallet tag of Embodiment 44, wherein the master case tag is a same type as the pallet tag.

Embodiment 50

An electronic tag comprising:
a receiver configured to receive data of one or more items to be transported;
a transmitter configured to transmit data of the one or more items to be transported to a central data storage unit;
a memory configured to store the data of one or more items to be transported and tag identifying information; and
a node processor configured to arrange the tag as part of a mesh network, such that the receiver is further configured to receive data transmitted from a different tag, and such that the transmitter is further configured to transmit at least one of the data received from the different tag and the tag identifying information to the at least one of the central data storage unit and another tag, wherein the data of the one or more items includes at least one of: the type of item, proximity of items to each other, ID code of the item and location of the items.

Embodiment 51

The electronic tag according to Embodiment 50, further comprising a power supply configured to receive power via an RF transmission.

Embodiment 52

The electronic tag according to Embodiment 50, wherein the tag is one of RF, RFID, WiFi, Bluetooth, Bluetooth Low Energy, Active Bat, NFC and Foundation Fieldbus H1.

Embodiment 53

The electronic tag according to Embodiment 50, further comprising a unique tag identifier stored in the memory.

Embodiment 54

The electronic tag according to Embodiment 50, wherein the memory is configured to store a message concerning the data of the one or more items.

Embodiment 55

The electronic tag according to Embodiment 54, wherein the message is at least one of encoded and encrypted.

Embodiment 56

The electronic tag according to Embodiment 50, further comprising a tamper-evident housing configured to house the receiver, the transmitter, the memory and the node processor.

Embodiment 57

A method of authenticating the contents of a shipping container, the contents including items contained in a plurality of master cases, the master cases stored on a plurality of pallets, the pallets stored in the shipping container, the method comprising:
receiving and storing, in a plurality of master case electronic tags, data of the items;
receiving, in a plurality of pallet electronic tags, data of the master cases;
iteratively scanning the data of the master cases;
comparing previously-scanned data of the master cases with subsequently-scanned data of the master cases;
receiving data of the pallets;
iteratively scanning the data of the pallets;
comparing previously-scanned data of the pallets with subsequently-scanned data of the pallets; and
recording an event in a processor when at least one of:
the compared data of the master cases exceeds a predetermined difference; and
the compared data of the pallets exceeds a predetermined difference.

Embodiment 58

The method according to Embodiment 57, wherein:
the receiving data of the master cases occurs only in master cases closest to the pallet; and
the receiving data of the pallets occurs only in pallets closest to a central data storage unit.

Embodiment 59

The method according to Embodiment 57, wherein the receiving data of the pallets comprises receiving data of all items in the shipping container.

Embodiment 60

The method according to Embodiment 57, wherein the receiving data of the master cases and the receiving data of the pallets occurs without opening the shipping container.

Embodiment 61

The method according to Embodiment 57, wherein the plurality of master case electronic tags and the plurality of pallet electronic tags cases are part of a mesh node network connected to a central data storage unit.

Embodiment 62

The method according to Embodiment 57, wherein:
the data of the master cases includes the relative position among the master cases; and
the data of the pallets includes the relative position among the pallets.

Embodiment 63

The method according to Embodiment 57, wherein receiving and storing data of the items is performed by user input.

Embodiment 64

The method according to Embodiment 63, wherein the user input is at least one of keyed in and scanned in.

Embodiment 65

At least one computer that executes an application authenticating the contents of a shipping container, the contents including items contained in a plurality of master cases, the master cases stored on a plurality of pallets, the pallets stored in the shipping container, the at least one computer comprising:
a memory that stores the application; and
a processor that executes the application, wherein the application, when executed by the processor, causes the computer at least to:
  receive and store data of the items;
  receive data of the master cases;
  iteratively scan the data of the master cases;
  compare previously-scanned data of the master cases with subsequently-scanned data of the master cases;
  receive data of the pallets;
  iteratively scan the data of the pallets;
  compare previously-scanned data of the pallets with subsequently-scanned data of the pallets; and
  record an event when at least one of:
    the compared data of the master cases exceeds a predetermined difference; and
    the compared data of the pallets exceeds a predetermined difference.

Embodiment 66

At least one non-transitory computer readable medium for authenticating the contents of a shipping container, the contents including items contained in a plurality of master cases, the master cases stored on a plurality of pallets, the pallets stored in the shipping container, the medium comprising:
  a receiving and storing code segment which, when executed by the computer, receives and stores data of the items;
  a receiving code segment which, when executed by the computer, receives data of the master cases;
  an iteratively scanning code segment which, when executed by the computer, iteratively scans the data of the master cases;
  a comparing code segment which, when executed by the computer, compares previously-scanned data of the master cases with subsequently-scanned data of the master cases;
  a receiving code segment which, when executed by the computer, receives data of the pallets;
  an iteratively scanning code segment which, when executed by the computer, iteratively scans the data of the pallets;
  a comparing code segment which, when executed by the computer, compares previously-scanned data of the pallets with subsequently-scanned data of the pallets; and
  a recording code segment which, when executed by the computer, records an event when at least one of:
    the compared data of the master cases exceeds a predetermined difference; and
    the compared data of the pallets exceeds a predetermined difference.

Embodiment 67

A system for authenticating the contents of a shipment, the contents including items contained in a plurality of master cases, the master cases stored on a plurality of pallets, the pallets stored in a plurality of shipping containers, the shipping containers located on a transporter, the system comprising:
  a container data storage unit located in each shipping container of the plurality of shipping containers and configured to receive data transmitted thereto and to transmit container data storage unit data to a transporter data storage unit; and
  a plurality of electronic tags located in each shipping container and configured to store data of the items, and further configured to transmit data of the items to each container data storage unit, wherein the a transporter data storage unit is configured to store the container data storage unit data.

Embodiment 68

The system according to Embodiment 67, wherein the container data storage unit data includes GPS data of the location of a container data storage unit.

Embodiment 69

The shipping container of Embodiment 1, wherein the plurality of electronic tags comprise:
at least one tag affiliated with a user; and
at least one tag unaffiliated with the user, wherein at least one of the central data storage unit and the least one tag affiliated with the user are configured to receive data from the at least one tag unaffiliated with the user.

What is claimed is:
1. A method of authenticating the contents of a shipping container, the contents including items contained in a plurality of master cases, the master cases stored on a plurality of pallets, the pallets stored in the shipping container, the method comprising:
  receiving and storing, in a plurality of master case electronic tags, data of the items from electronic item tags contained in the master cases;
  receiving, in a plurality of pallet electronic tags, data of the master cases;
  iteratively scanning the data of the master cases;
  comparing previously-scanned data of the master cases with subsequently-scanned data of the master cases;

receiving data of the pallets;
iteratively scanning the data of the pallets;
comparing previously-scanned data of the pallets with subsequently-scanned data of the pallets; and
recording an event in a processor when at least one of:
the compared data of the master cases exceeds a predetermined difference; and
the compared data of the pallets exceeds a predetermined difference.

2. The method according to claim 1, wherein:
the receiving data of the master cases occurs only in master cases closest to the pallet; and
the receiving data of the pallets occurs only in pallets closest to a central data storage unit.

3. The method according to claim 1, wherein the receiving data of the pallets comprises receiving data of all items in the shipping container.

4. The method according to claim 1, wherein the receiving data of the master cases and the receiving data of the pallets occurs without opening the shipping container.

5. The method according to claim 1, wherein the plurality of master case electronic tags and the plurality of pallet electronic tags cases are part of a mesh node network connected to a central data storage unit.

6. The method according to claim 1, wherein:
the data of the master cases includes the relative position among the master cases; and
the data of the pallets includes the relative position among the pallets.

7. The method according to claim 1, wherein receiving and storing data of the items is performed by user input.

8. The method according to claim 7, wherein the user input is at least one of keyed in and scanned in.

9. The method according to claim 1, wherein the plurality of master case electronic tags and plurality of pallet electronic tags comprise:
at least one tag affiliated with a user; and
at least one tag unaffiliated with the user, wherein at least one of the central data storage unit and the least one tag affiliated with the user are configured to receive data from the at least one tag unaffiliated with the user.

10. At least one computer that executes an application authenticating the contents of a shipping container, the contents including items contained in a plurality of master cases, the master cases stored on a plurality of pallets, the pallets stored in the shipping container, the at least one computer comprising:
a memory that stores the application; and
a processor that executes the application, wherein the application, when executed by the processor, causes the computer at least to:
receive and store data of the items from electronic item tags contained in the master cases;
receive data of the master cases;
iteratively scan the data of the master cases;
compare previously-scanned data of the master cases with subsequently-scanned data of the master cases;
receive data of the pallets;
iteratively scan the data of the pallets;
compare previously-scanned data of the pallets with subsequently-scanned data of the pallets; and
record an event when at least one of:
the compared data of the master cases exceeds a predetermined difference; and
the compared data of the pallets exceeds a predetermined difference.

11. At least one non-transitory computer readable medium for authenticating the contents of a shipping container, the contents including items contained in a plurality of master cases, the master cases stored on a plurality of pallets, the pallets stored in the shipping container, the medium comprising:
a receiving and storing code segment which, when executed by the computer, receives and stores data of the items from electronic item tags contained in the master cases;
a receiving code segment which, when executed by the computer, receives data of the master cases;
an iteratively scanning code segment which, when executed by the computer, iteratively scans the data of the master cases;
a comparing code segment which, when executed by the computer, compares previously-scanned data of the master cases with subsequently-scanned data of the master cases;
a receiving code segment which, when executed by the computer, receives data of the pallets;
an iteratively scanning code segment which, when executed by the computer, iteratively scans the data of the pallets;
a comparing code segment which, when executed by the computer, compares previously-scanned data of the pallets with subsequently-scanned data of the pallets; and
a recording code segment which, when executed by the computer, records an event when at least one of:
the compared data of the master cases exceeds a predetermined difference; and
the compared data of the pallets exceeds a predetermined difference.

12. A system for authenticating the contents of a shipment, the contents including items contained in a plurality of master cases, the master cases stored on a plurality of pallets, the pallets stored in a plurality of shipping containers, the shipping containers located on a transporter, the system comprising:
a container data storage unit located in each shipping container of the plurality of shipping containers and configured to receive data transmitted thereto and to transmit container data storage unit data to a transporter data storage unit;
a plurality of electronic tags located in each shipping container and configured to store data of the items, and further configured to transmit data of the items to each container data storage unit, wherein the a transporter data storage unit is configured to store the container data storage unit data; and
a processor configured to:
receive and store data of the items from electronic item tags contained in the master cases;
receive data of the master cases;
iteratively scan the data of the master cases;
compare previously-scanned data of the master cases with subsequently-scanned data of the master cases;
receive data of the pallets;
iteratively scan the data of the pallets;
compare previously-scanned data of the pallets with subsequently-scanned data of the pallets; and
record an event when at least one of:
the compared data of the master cases exceeds a predetermined difference; and
the compared data of the pallets exceeds a predetermined difference.

13. The system according to claim 12, wherein the container data storage unit data includes GPS data of the location of a container data storage unit.

\* \* \* \* \*